Aug. 27, 1968  JACKSON CHUNG  3,398,597
SPEED REDUCER
Filed Oct. 20, 1966
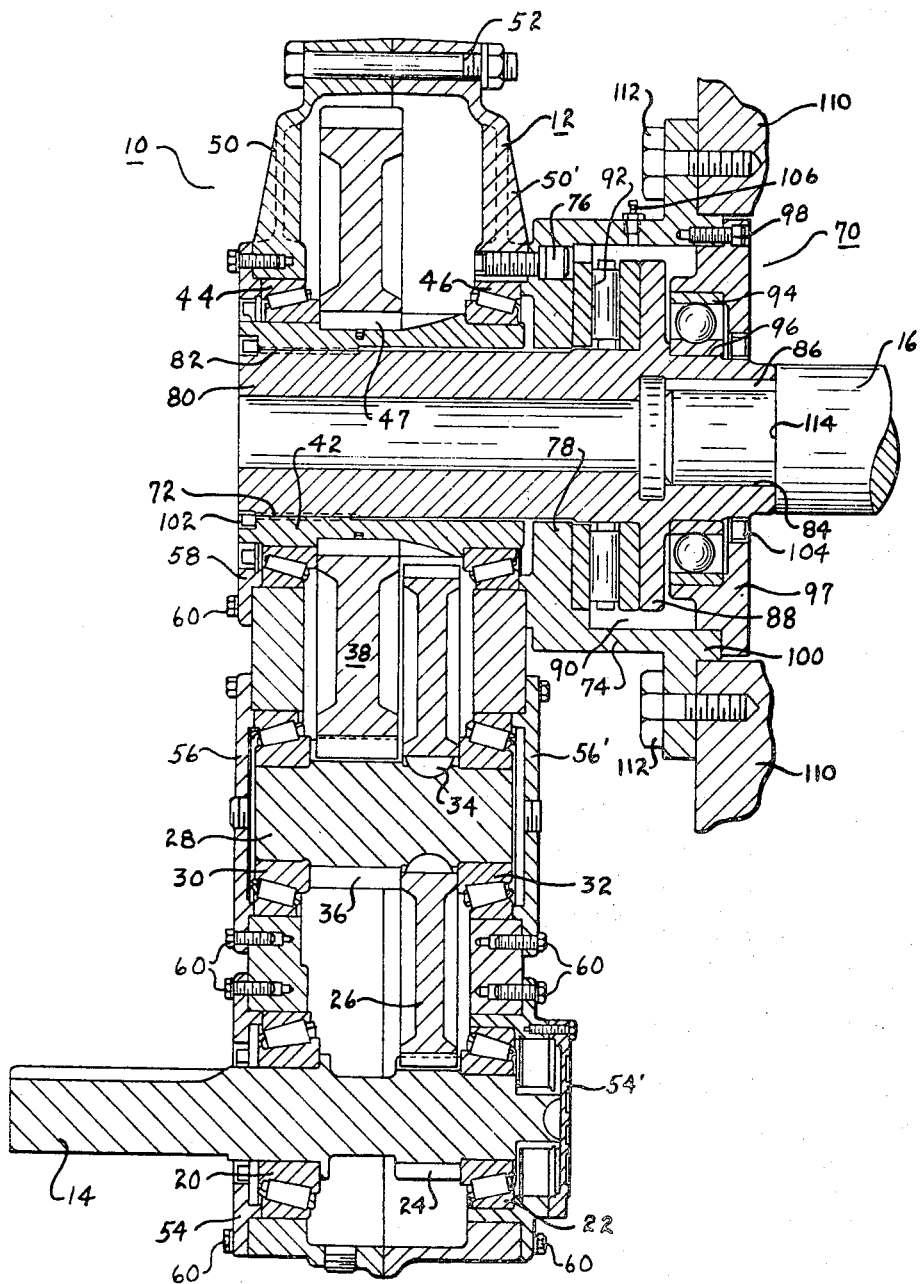
INVENTOR.
JACKSON CHUNG
BY M. A. Stobbs
ATTORNEY United States Patent Office 3,398,597
Patented Aug. 27, 1968

3,398,597
SPEED REDUCER
Jackson Chung, Mishawaka, Ind., assignor to The Reliance Electric and Engineering Company, a corporation of Ohio
Filed Oct. 20, 1966, Ser. No. 588,125
10 Claims. (Cl. 74—421)

ABSTRACT OF THE DISCLOSURE

A speed reducer mechanism which supports and drives a driven shaft and which contains both thrust and radial bearings to support the driven shaft against axial and radial forces. The input and output shafts are connected by a plurality of reducing gears and the output shaft is connected directly to the supported driven shaft.

In conventional installations of speed reducers for power transmission equipment, the reducers are installed in such a manner that they are primarily subjected only to radial forces, and are often mounted on and supported by the driven shaft and its bearings. This type of reducer uses a torque arm connected at one end to the reducer housing and at the other end to an anchor means for holding the reducer against rotational movement imparted to the unit by the input and output forces. In the past, a separate unit or an adapter mounted on the driven equipment and containing a thrust bearing was used to support one end of the driven shaft and to support the speed reducer. Since this type of installation assembly involved several different sets of bearings disposed in separate operating parts or units, alignment of the various bearings was difficult to accomplish and often entailed a substantial amount of work and effort in order to install, properly adjust and align the reducer, adapter and driven shaft. It is therefore one of the principal objects of the present invention to provide a speed reducer adapted to be mounted on or at the end of a driven shaft, which is capable of handling both radial and thrust forces and which will readily align itself with the driven shaft and adapt to misalignment without placing any undue strain or extraneous forces on the operating parts thereof.

Another object of the invention is to provide a speed reducer of the aforementioned type which includes a quill assembly containing both the radial and thrust bearings, and being of a unitary construction so that the required size can be readily assembled in the reducer in operating position and thereafter mounted in place on the driven equipment as an integral part of the reducer.

A further object is to provide a reducer having a quill assembly with the thrust bearing forming an integral part thereof, which can be mounted on the reducer as a unit and rigidly secured thereto in proper alignment with the output shaft of the reducer, without any special adjustments or special fitting.

Additional objects and advantages of the invention will become apparent from the following description and accompanying drawing wherein a vertical cross sectional view of a speed reducer embodying the present invention is shown, with the parts of the speed reducer being rearranged for the purpose of illustrating the entire construction and operation in one figure, the operative relationship between the parts otherwise being maintained throughout.

Referring more specifically to the drawing, numeral 10 designates generally the present speed reducer having a housing 12 and input shaft 14 connected to an output shaft 16 by a train of gears. The speed reducer is normally driven by an electric motor through a belt trained on a sheave on the motor shaft and a sheave on shaft 14. The output shaft 16 is, for the purpose of illustration, considered as an extension of the shaft of an extruder or other type of equipment having a shaft subjected to a thrust force in the direction from right to left as viewed in the drawing. In the construction in which the present speed reducer is used, the end of the shaft shown in the drawing is supported by the speed reducer, which must absorb the thrust forces of the shaft 16. The speed reducer is bolted or otherwise secured to the driven equipment by studs extending through the reducer housing, and preferably through an adapter into a supporting structure on the driven equipment surrounding shaft 16. Various adapters or structures for mounting the speed reducer rigidly on the driven equipment may be used in various installations.

In the speed reducer 10, shaft 14 is journaled in the housing on roller bearings 20 and 22 and is provided with a small gear 24 for meshing with a large gear 26, the latter gear being mounted on idle shaft 28 journaled in the housing in roller bearings 30 and 32, gear 26 being secured for rotation therewith by key 34. Shaft 28 contains a small gear 36 which meshes with a large gear 38 rigidly secured to a hub 42 journaled in the housing on roller bearings 44 and 46, gear 38 being keyed to hub 42 by a key 47. The housing is normally made in two sections, 50 and 50', secured together by a plurality of bolts 52 extending through holes in a plurality of bosses spaced around the periphery of the housing. In order to give immediate access to the various bearings and shafts 14, 28 and 42, openings with covers 54, 56 and 58 are provided and the covers are secured to the housing by a plurality of screws 60 extending through the covers into threaded bores in the housing.

Shaft 16 is supported directly by bearing unit 70 seated in bore 72 of hub 42. This unit consists of a housing 74 generally cylindrical in shape, bolted directly to section 50' of housing 12 by a plurality of screws 76 extending through inner wall 78 of the housing, rigidly seating the wall of the housing 74 against the face of section 50', and a shaft 80 inserted in bore 72 of hub 42 and held against relative movement therewith by a spline structure 82, thereby keying shaft 80 with hub 42. Shaft 80 is provided with an enlarged bore 84 in the right hand end, as viewed in the drawing, for receiving the end of shaft 16, the shaft being secured to the shaft 80 by a key 86 seated in key-ways in the shaft 80 and the shaft 16. Shaft 80 has an annular flange 88 formed integrally therewith and extending radially therefrom into chamber 90 of housing 74. The flange is spaced from the inner surface of wall 78 and a thrust roller bearing 92 is seated in the space between the wall and flange. The flange transmits the thrust forces from shafts 16 and 80 to the bearing, which is held against endwise movement in unit 70 by wall 78. A radial ball bearing 94 is seated on shoulder 96 of shaft 80 and is held rigidly in place by a cover 97, secured to housing 74 by a plurality of screws 98 extending through the marginal edge of cover 97 into threaded bores in the side walls 100 of the housing. The two ends of shaft 80 are sealed by seals 102 and 104, and chamber 90 is supplied with a suitable lubricant through fixture 106 in the side wall of housing 74.

In the use and operation of the present speed reducer, the proper radial and thrust bearing unit 70 is selected for the respective shaft 16, and housing 74 thereof is rigidly secured to section 50' of housing 12 by screws 76. After unit 70 and the main speed reducer have been assembled in the manner illustrated in the drawing, the assembly is mounted on the end wall 110 of an extruder by screws 112, for example, with shaft 16 of the extruder blade seated in enlarged bore 84 of shaft 80 with shoulder 114 seated against the end of said shaft, the housing 74 normally being firmly secured to the end of the extruder equipment in order to support the bearing unit 70 and the speed reducer. After the motor has been connected to the reducer by a sheave on the motor, a belt and a sheave on shaft 14, shaft 14 is driven, rotating small gear 24 which in turn rotates large gear 26 on shaft 28. Gear 36 on shaft 28 in turn drives large gear 38 on hub 42, and rotation of hub 42 drives shaft 80 through the spline 82. During the operation of the reducer and extruder equipment, shaft 16 is supported by radial bearing 94 and thrust bearing 92 in housing 74, which retain the shaft in proper alignment in the driven equipment. Shaft 80 readily adjusts itself to any misalignment with shaft 16, thus avoiding, within normal operating limits, any binding or excess strain on the two bearings 92 and 94 of shaft 80, or bearings 44 and 46 of hub 42.

It is seen from the foregoing structure that various units 70 can be selected, depending upon the nature of the equipment to be driven, and these units can be inserted in the speed reducer and secured rigidly in place thereon at the time the installation is made. In addition, the bearing unit and speed reducer are compact, readily assembled and disassembled, and easily serviced and adjusted to obtain optimum performance. The reducer with bearing unit 70 effectively supports one end of shaft 16 and retains the shafts 16 and 80 in proper operating alignment.

While only one embodiment of the present speed reducer mechanism and bearing unit have been described in detail herein, various changes and modifications may be made without departing from the scope of the invention.

I claim:

1. A speed reducer mechanism for driving and supporting a driven shaft, comprising a housing, an input shaft journaled in said housing, a hub having an axial bore therein journaled in said housing in parallel relation with said input shaft, reduction gears operatively disposed between said input shaft and hub, and a bearing uint having a shaft disposed in the bore of said hub for rotation therewith and extending therefrom, a casing around said shaft extension, a thrust bearing and a radial bearing mounted in said casing for journaling said shaft extension, and a means forming a part of said last mentioned shaft for supporting the driven shaft against both radial and thrust forces.

2. The speed reducer mechanism as defined in claim 1 in which said casing is provided with an inner annular wall and said shaft extension is provided with a radial collar spaced from said casing wall, and a thrust bearing is disposed in said space.

3. A speed reducing mechanism as defined in claim 2 in which said thrust bearing is a roller bearing.

4. A speed reducer mechanism as defined in claim 2 in which a bearing is mounted on said shaft extension and is supported by said casing for supporting said last mentioned shaft against radial forces.

5. A speed reducing mechanism as defined in claim 4 in which said bearing unit shaft is seated in the bore in said hub and is operatively connected thereto by a spline construction.

6. A speed reducing mechanism as defined in claim 5 in which said hub extends through said housing and said bearing unit shaft extends through said hub and is provided with a bore which extends therethrough.

7. A speed reducer mechanism as defined in claim 6 in which the means in said last mentioned shaft for supporting a driven shaft against both radial and thrust forces includes an enlarged bore and a keyway structure interlocking said last mentioned shaft and said driven shaft.

8. A speed reducer mechanism as defined in claim 1 in which a bearing is mounted on said shaft extension and is supported by said casing for supporting said first mentioned driven shaft against radial forces.

9. A speed reducing mechanism as defined in claim 1 in which said bearing unit shaft is seated in the bore in said hub and is operatively connected thereto by a spline construction.

10. A speed reducer mechanism as defined in claim 1 in which the means in said last mentioned shaft for supporting a driven shaft against both radial and thrust forces includes an enlarged bore and a keyway structure interlocking said last mentioned shaft and said driven shaft.

References Cited

UNITED STATES PATENTS

| | | | |
|---|---|---|---|
| 2,504,066 | 4/1950 | Christian | 74—421 |
| 3,154,963 | 11/1964 | Caley et al. | 74—421 |

FRED C. MATTERN, Jr., *Primary Examiner.*

LEONARD H. GERIN, *Assistant Examiner.*